UNITED STATES PATENT OFFICE.

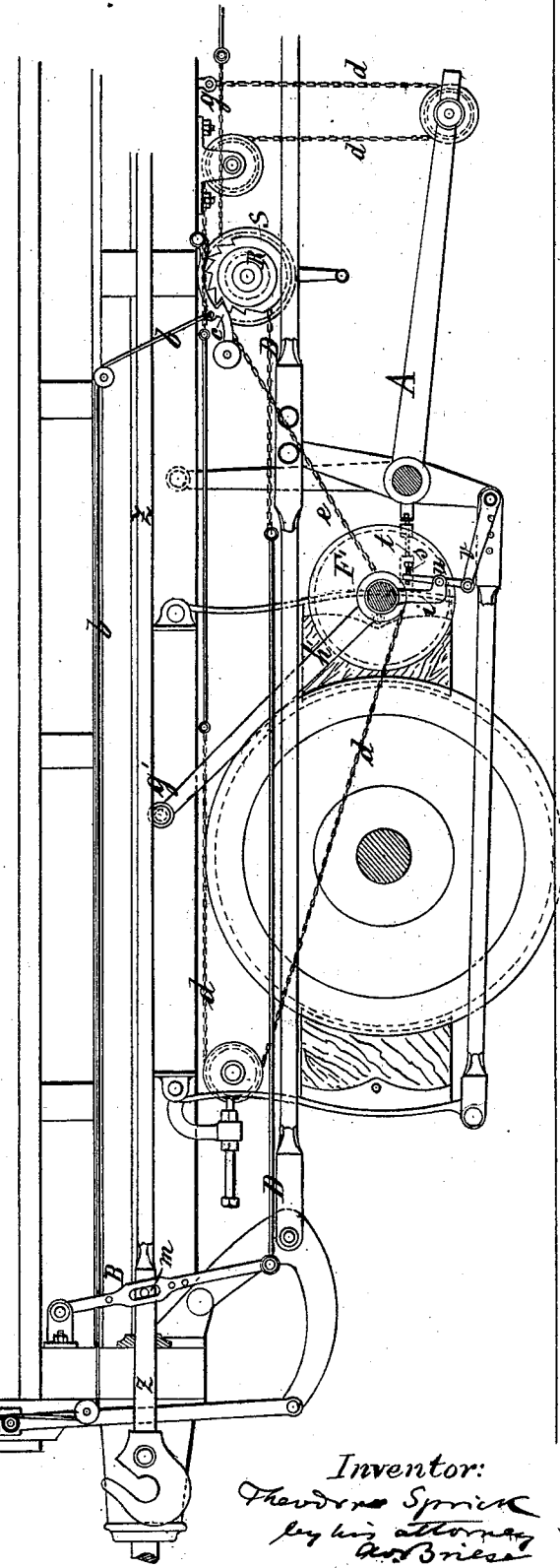

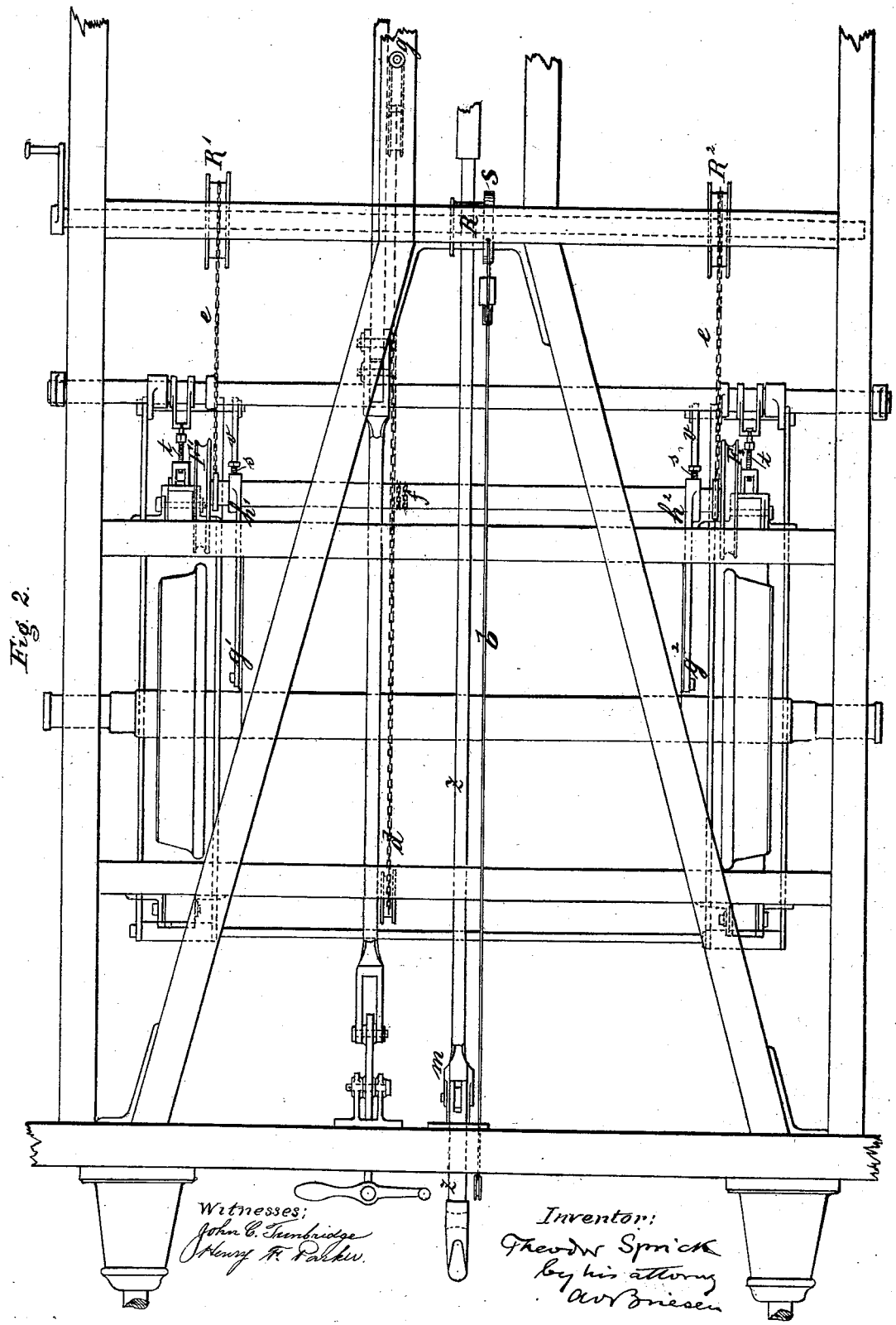

THEODOR SPRICK, OF ODESSA, RUSSIA.

FRICTION-BRAKE FOR CARS.

SPECIFICATION forming part of Letters Patent No. 243,736, dated July 5, 1881.

Application filed March 26, 1881. (No model.)

*To all whom it may concern:*

Be it known that I, THEODOR SPRICK, residing at Odessa, in the Empire of Russia, and a subject of the Emperor of Austria, have invented Improvements in Friction-Brakes for Railway-Carriages, of which the following is a specification.

The advantages of this improved brake are the following: First, the braking is effected by means of the draw-line or signal-rope. Second, the unbraking or removing of the brake is effected by the traction of the engine. Third, the ordinary hand-brake may be used instead of the friction-brake, and vice versa. Fourth, the braking is impossible while the carriage is drawn with the draw-hook. Fifth, in case of the dismemberment of a railway-train the dismembered part is instantly and automatically braked in consequence of the straining of the draw-line. Sixth, the carriages provided with this brake can be braked in every direction of the railway-line.

In order that my said invention may be more clearly understood, I will proceed, aided by the accompanying drawings, more fully to describe the same.

In the accompanying drawings, Figure 1 is a sectional side elevation of my improved brake, showing it on a truck. Fig. 2 is a top view of the same. Fig. 3 is a detail side view of the upper part of rod $b$, and of the pulleys $a$ $a$ and $a'$ for receiving the signal-line $l$.

When the brake is to be set at work the engine-driver pulls the signal-line $l$, Fig. 3, running on three pulleys, $a$ $a$ $a'$, and extending over all carriages. By so doing the rod or line $b$, Figs. 1, 2, 3, is drawn upward, and consequently the catch $c$ disengaged from the ratchet-wheel S. The suspended friction-rollers $F'$ $F^2$ are brought against the tires, the said friction-rollers being connected by chains $e$ $e$ with the rollers $R'$ $R^2$, keyed on the axle of the ratchet-wheel $S'$, and falling by their proper weight on the tires, when the catch $c$ disengages the wheel $S'$. The said rollers are now taken along by the tires, thus winding on their shaft $f$ a chain, $d$, fixed at $g$ on the carriage. The arm A, being elevated, presses all the brake-blocks against the tires, thus stopping the carriage in the well-known manner. In order to unbrake, the engine-driver has nothing to do but to put the steam on, so that the traction apparatus $z$ is drawn out, thus advancing the lever B by means of the tappet $m$. The lever B draws directly the rod or chain D, Fig. 1, and turns the roller R, Figs. 1 and 2, and the rollers $R'$ $R^2$, keyed on the same shaft, as well as the ratchet-wheel $S'$. The friction-rollers $F'$ and $F^2$ are disengaged from the tires by means of the rollers $R'$ $R^2$ and chains $e$. The arm of lever A sinks by its weight and disengages the brake-blocks from the wheels. The shaft $f$, bearing the friction-rollers $F'$ and $F^2$, is suspended on the arms $h'$ and $h^2$, movable at the points $g'$ and $g^2$. These arms have a shoulder, $i$, on which is applied a link, $u$ $v$, with a set-screw, $s$, and by tightening or slackening this screw the pressure of the blocks against the wheels is weakened or augmented. The screw $t$ serves to regulate the brake-blocks.

I claim—

1. In a friction-brake for railway-carriages, the combination of the draw-line $l$ with the rod or line $b$, catch $c$, ratchet-wheel S, chain $e$, and shaft $f$, having rollers $F'$ $F^2$, and with the chain $d$, brake-lever A, traction slide $z$, tappet $m$, lever B, and chain D, substantially as herein shown and described.

2. In a friction-brake, the combination of the draw-line $l$ of the rollers $a$ $a'$ and rod, rope, or chain $b$ with the catch $c$ of the ratchet-wheel $S'$, and with the friction-rollers $F'$ $F^2$, for the purpose herein described.

3. In a friction-brake, the combination of the draw-hook, $z$ of the levers B and rod or chain D with the roller R, fixed on the same shaft as the ratchet-wheel $S'$, and the rollers $R'$ $R^2$, for the purpose herein described.

4. The levers $h'$ $h^2$, connected with the friction-rollers $F'$ $F^2$, and the shoulders of the said levers, in combination with the adjustable links $u$ $v$ of the brake-lever A, for the purpose herein described.

In testimony whereof I have signed my name to this specification in the presence of two subscribing witnesses.

THEODOR SPRICK.

Witnesses:
E. S. MESPRUNG,
W. H. STUART.